(12) United States Patent
Yasaki et al.

(10) Patent No.: US 9,716,694 B2
(45) Date of Patent: Jul. 25, 2017

(54) ENCRYPTION METHOD AND INFORMATION PROCESSING DEVICE

(71) Applicant: FUJITSU LIMITED, Kawasaki-shi, Kanagawa (JP)

(72) Inventors: Koichi Yasaki, Kawasaki (JP); Hidenobu Ito, Kawasaki (JP); Takuya Sakamoto, Kawasaki (JP); Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 14/791,652

(22) Filed: Jul. 6, 2015

(65) Prior Publication Data

US 2016/0057113 A1    Feb. 25, 2016

(30) Foreign Application Priority Data

Aug. 22, 2014    (JP) ................................. 2014-169946

(51) Int. Cl.
*H04L 29/06* (2006.01)
*H04W 12/02* (2009.01)

(52) U.S. Cl.
CPC ........ *H04L 63/0428* (2013.01); *H04L 63/205* (2013.01); *H04W 12/02* (2013.01)

(58) Field of Classification Search
CPC . H04L 63/205; H04L 63/0428; H04L 63/045; H04L 9/14; H04W 12/02
See application file for complete search history.

(56) References Cited

U.S. PATENT DOCUMENTS

| | | | | |
|---|---|---|---|---|
| 5,070,528 | A | * 12/1991 | Hawe | ..................... H04L 29/06 713/161 |
| 5,822,434 | A | * 10/1998 | Caronni | ................ G06F 21/606 713/155 |
| 6,016,491 | A | 1/2000 | Kou | |

(Continued)

FOREIGN PATENT DOCUMENTS

| JP | 10-105449 | 4/1998 |
|---|---|---|
| JP | 2002-512412 | 4/2002 |

(Continued)

*Primary Examiner* — Eric W Shepperd
(74) *Attorney, Agent, or Firm* — Staas & Halsey LLP

(57) ABSTRACT

An encryption method for packaging, encrypting, and transmitting a plurality of contents included in a web application to a communication device, the encryption method includes: acquiring performance information relating to performance of the communication device; determining, by circuitry, an encryption algorithm to be applied to each of the plurality of contents, based on the performance information; performing first encryption processing on the plurality of contents using the encryption algorithm respectively; performing second encryption processing on identification information that identifies the encryption algorithm used for the plurality of contents respectively; packaging encrypted contents and encrypted identification information, the encrypted identification information being stored in a location specified by the communication device; and transmitting the encrypted contents and the encrypted identification information, which are packaged, to the communication device.

16 Claims, 20 Drawing Sheets

(56) References Cited

U.S. PATENT DOCUMENTS

| | | | |
|---|---|---|---|
| 7,219,223 B1* | 5/2007 | Bacchus | H04L 63/0428 |
| | | | 713/150 |
| 9,077,709 B1* | 7/2015 | Dall | H04L 63/0823 |
| 2004/0049648 A1 | 3/2004 | Sato et al. | |
| 2007/0036358 A1* | 2/2007 | Nguyen | H04L 41/0806 |
| | | | 380/270 |
| 2008/0101598 A1* | 5/2008 | Dillaway | H04L 63/20 |
| | | | 380/44 |
| 2010/0017597 A1* | 1/2010 | Chandwani | H04L 29/1232 |
| | | | 713/156 |
| 2010/0299529 A1* | 11/2010 | Fielder | H04L 9/12 |
| | | | 713/181 |
| 2011/0307705 A1* | 12/2011 | Fielder | G06F 21/62 |
| | | | 713/181 |
| 2014/0092884 A1* | 4/2014 | Murphy | H04L 41/00 |
| | | | 370/338 |
| 2015/0256960 A1* | 9/2015 | Chemishkian | H04W 4/005 |
| | | | 370/338 |
| 2015/0365382 A1* | 12/2015 | Balakrishnan | H04L 63/0428 |
| | | | 713/168 |

FOREIGN PATENT DOCUMENTS

| | | |
|---|---|---|
| JP | 2004-199300 | 7/2004 |
| JP | 2004-524634 | 8/2004 |
| JP | 2005-157893 | 6/2005 |
| WO | WO 99/55055 | 10/1999 |

* cited by examiner

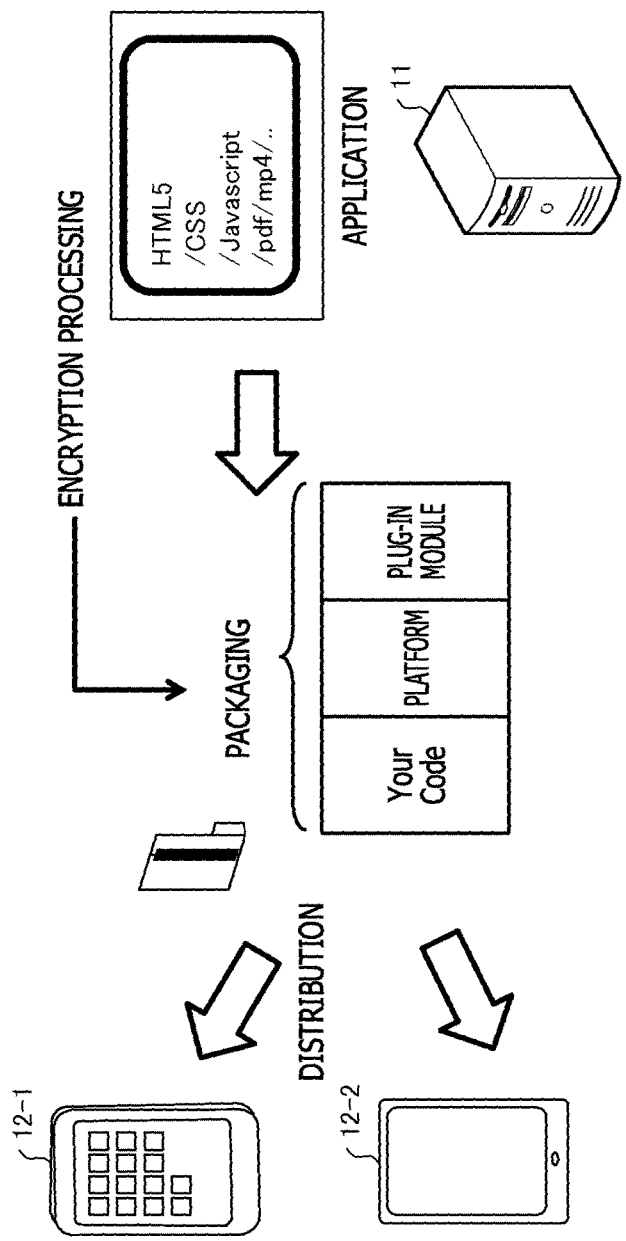

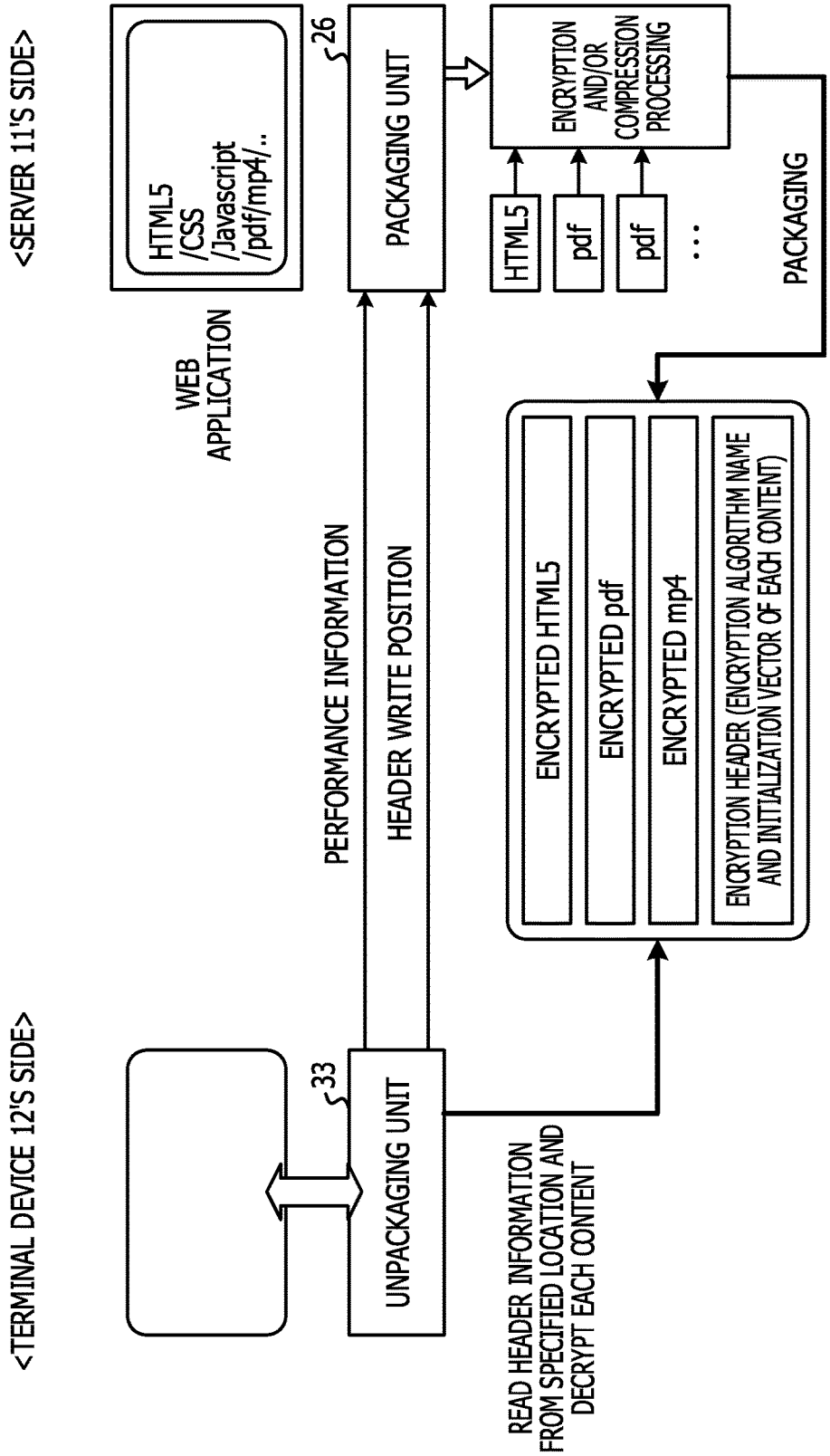

FIG. 5A

| | INSTALLED OS | | PERFORMANCE INFORMATION | | | | | HEADER WRITE POSITION |
|---|---|---|---|---|---|---|---|---|
| | | | AES PROCESSING SPEED | | | | | |
| | OS VERSION TYPE NAME | APPLICATION EXECUTION ENGINE NAME | 128 | OPERATION MODE OF UNPACKAGING UNIT | 256 | OPERATION MODE OF UNPACKAGING UNIT | STANDARD | OPERATION MODE OF UNPACKAGING UNIT | PLAINTEXT | |
| TERMINAL 1 | Android 4.1.2 | /F-1XX/Dalvic | 8MB/sec | 1 | 7MB/sec | 1 | 14MB/sec | 1 | 28MB/sec | END OF PACKAGE |
| TERMINAL 2 | Android 4.4.2 | /F-0XX/ART | 23MB/sec | 2 | 21MB/sec | 2 | 28MB/sec | 2 | 56MB/sec | OFFSET FROM BEGINNING 1024th BYTE |

FIG. 5B

| | INSTALLED OS | | PERFORMANCE INFORMATION | | | | | HEADER WRITE POSITION |
|---|---|---|---|---|---|---|---|---|
| | | | AES PROCESSING SPEED | | | | | |
| | OS VERSION TYPE NAME | APPLICATION EXECUTION ENGINE NAME | 128 | OPERATION MODE OF UNPACKAGING UNIT | 256 | OPERATION MODE OF UNPACKAGING UNIT | STANDARD | OPERATION MODE OF UNPACKAGING UNIT | PLAINTEXT | |
| TERMINAL 1 | Android 4.1.2 | /F-1XX/Dalvic | 8MB/sec | 1 | 7MB/sec | 1 | 14MB/sec | 1 | 28MB/sec | EXTENSION IS.epkg0 |
| TERMINAL 2 | Android 4.4.2 | /F-0XX/ART | 23MB/sec | 2 | 21MB/sec | 2 | 28MB/sec | 2 | 56MB/sec | FILE NAME IS Abcdefg.epkg |

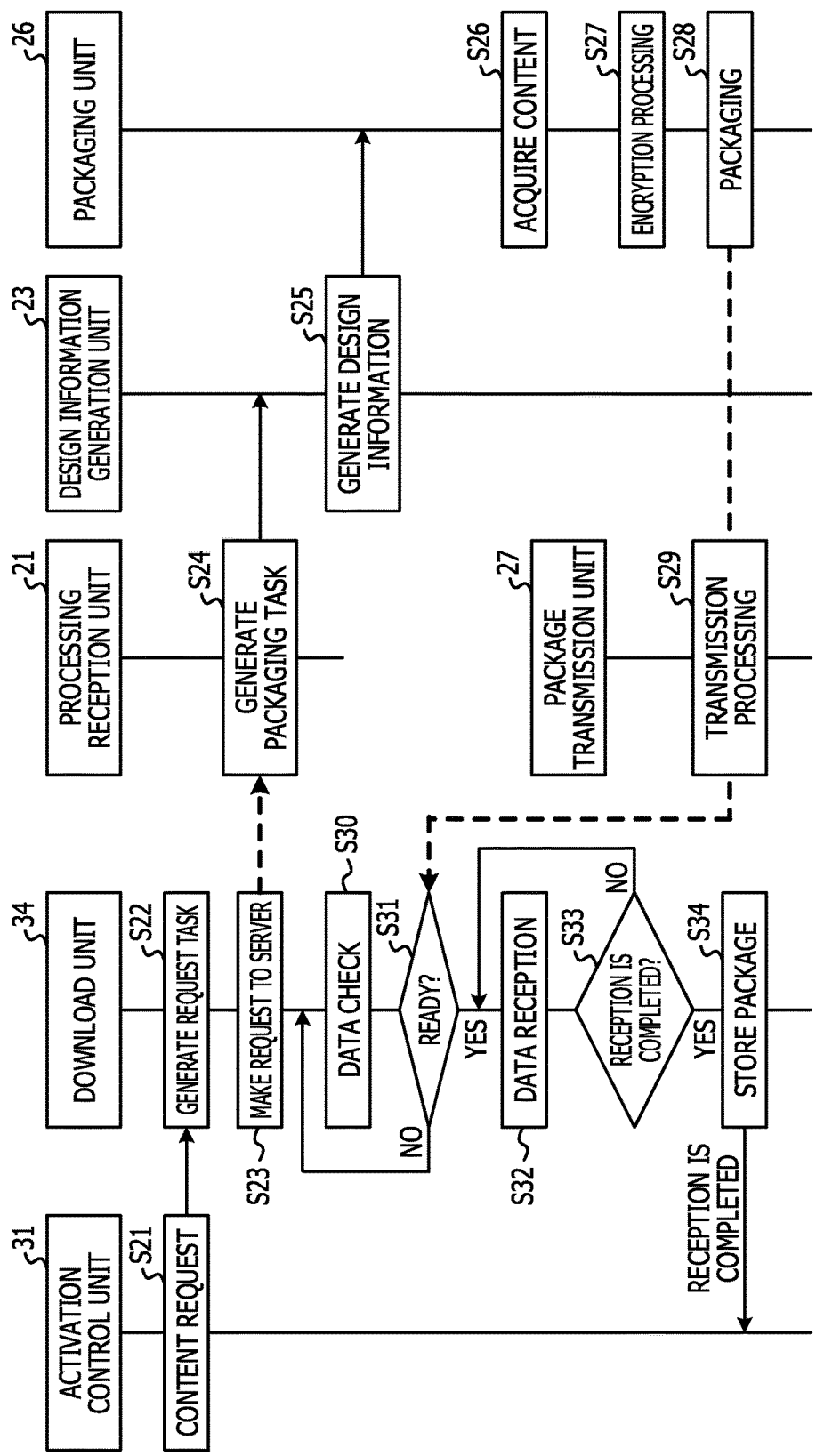

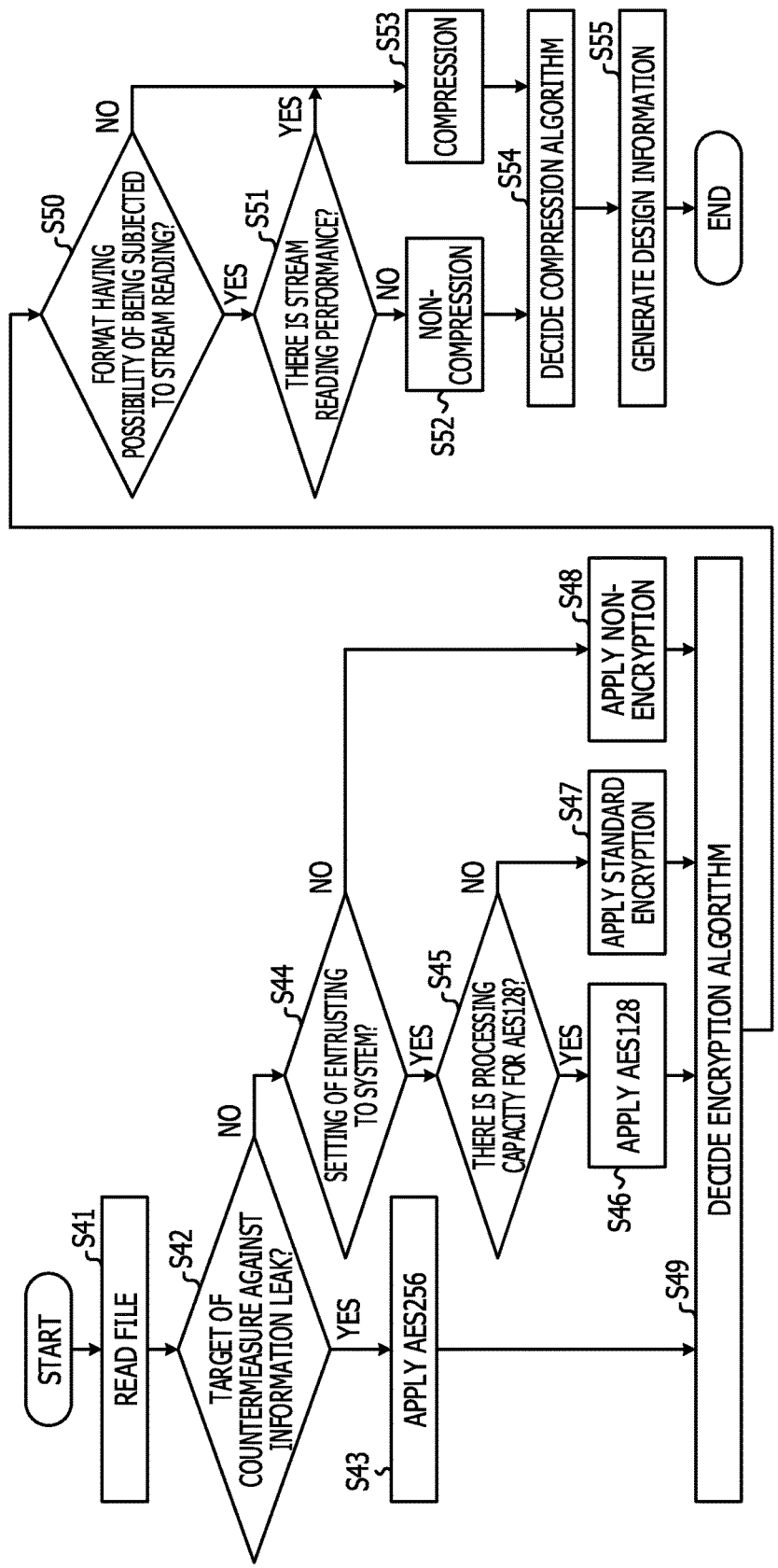

FIG. 10

```
<?xml version="1.0" encoding="UTF-8"?>
<widget xmlns="http://www.w3.org/ns/widgets">
    <pkg mode="EPKG" jni="Enable"/>   ⟸ OPERATION MODE OF UNPACKAGING UNIT
    <file name="a.html"
        EncMethod="ENC_METHOD_STANDARD"
        KEYSIZE=""
        compressMethod="STORE" compressLevel="" />
    <file name="b.pdf"
        EncMethod=" ENC_METHOD_AES "
        KEYSIZE=" AES_STRENGTH_256 "
        compressMethod=" DEFLATE " compressLevel=" ULTRA " />
    <file name="c.mp4"
        EncMethod=" ENC_METHOD_AES "
        KEYSIZE=" AES_STRENGTH_256 "
        compressMethod=" STORE " compressLevel="" />
    <file name="d.js"
        EncMethod="NONE"
        KEYSIZE=""
        compressMethod="" compressLevel="" />
    <file name="e.css"
        EncMethod="NONE"
        KEYSIZE=""
        compressMethod="" compressLevel="" />
</widget>
```

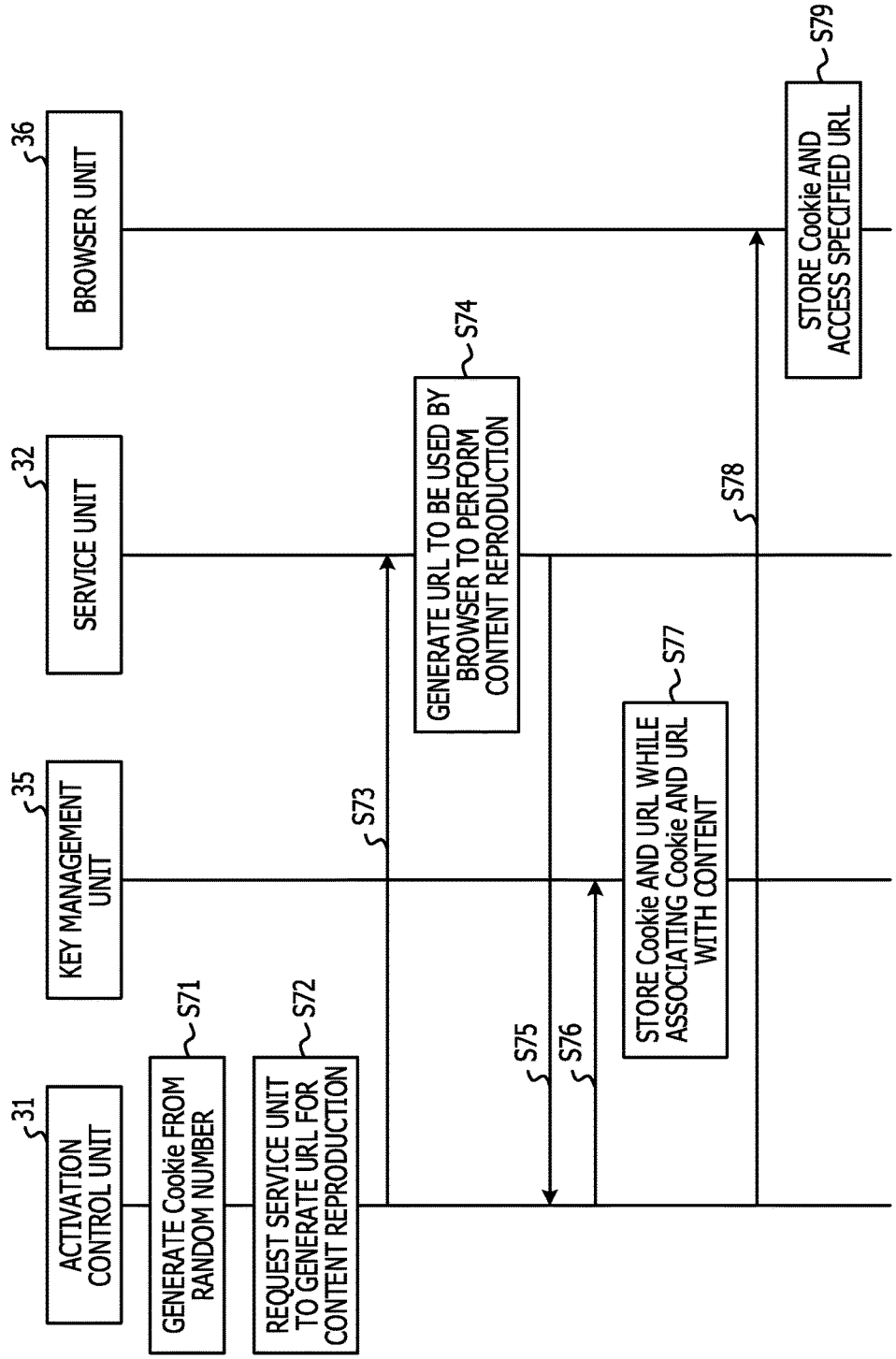

FIG. 16

| CONTENT NAME | PACKAGE NAME | "RECEIVED" FLAG |
|---|---|---|
| Service NAME/Index.html | abc.epkg1 | FINISHED |
| Service NAME/a.pdf | Abc.epkg2 | UNFINISHED |
| Service NAME/c.mp4 | edf.epkg1 | UNFINISHED |

FIG. 19

| FILE NAME | ENCRYPTION PARAMETERS | | COMPRESSION PARAMETER | ENCRYPTION KEY FOR EACH FILE | ESTIMATED TIME | PACKAGE NAME |
| --- | --- | --- | --- | --- | --- | --- |
| | ALGORITHM | INITIAL VECTOR | | | | |
| Index.html | AES256 | 17ab86… | Deflate ALGORITHM | 769812… | 3 min | Uyvg.epkg2 | ns # ENCRYPTION METHOD AND INFORMATION PROCESSING DEVICE

CROSS-REFERENCE TO RELATED APPLICATION

This application is based upon and claims the benefit of priority of the prior Japanese Patent Application No. 2014-169946, filed on Aug. 22, 2014, the entire contents of which are incorporated herein by reference.

FIELD

The embodiments discussed herein are related to an encryption method and an information processing device.

BACKGROUND

The types of Operating System (OS) that each perform various kinds of applications have been increasing year by year and it is desirable to efficiently develop applications compliant with various OSs. Therefore, in the past, development of applications, which utilizes a web technology, has been attracting attention.

In a case where an application is developed using the web technology, in the distribution of the application in a business field or the like, encryption processing (for example, encryption wrapping or the like) for packaging various kinds of contents included in the applications is performed as a countermeasure against information leak. In the encryption wrapping of the related art, an encrypted ZIP format is used and each content is encrypted using an encryption key generated from one password and an initialization vector. These technologies are disclosed in, for example, Japanese Laid-open Patent Publication No. 10-105449, Japanese National Publication of International Patent Application No. 2004-524634, Japanese Laid-open Patent Publication No. 2005-157893, Japanese National Publication of International Patent Application No. 2002-512412, and Japanese Laid-open Patent Publication No. 2004-199300.

SUMMARY

According to an aspect of the invention, an encryption method for packaging, encrypting, and transmitting a plurality of contents included in a web application to a communication device, the encryption method includes: acquiring performance information relating to performance of the communication device; determining, by circuitry, an encryption algorithm to be applied to each of the plurality of contents, based on the performance information; performing first encryption processing on the plurality of contents using the encryption algorithm respectively; performing second encryption processing on identification information that identifies the encryption algorithm used for the plurality of contents respectively; packaging encrypted contents and encrypted identification information, the encrypted identification information being stored in a location specified by the communication device; and transmitting the encrypted contents and the encrypted identification information, which are packaged, to the communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining an outline of the present embodiment;
FIG. 4 is a diagram illustrating a first embodiment of package distribution;
FIG. 5A and FIG. 5B are diagrams illustrating examples of information acquired from a terminal device;
FIG. 8 is a sequence diagram illustrating an example of package acquisition processing;
FIG. 9 is a flowchart illustrating an example of design information generation processing;
FIG. 10 is a diagram illustrating an example of design information;
FIG. 14 is a sequence diagram illustrating an example of generation of a URL for content reproduction;
FIG. 16 is a diagram illustrating examples of download states;
FIG. 19 is a diagram illustrating an example of data in the second embodiment.

DESCRIPTION OF EMBODIMENTS

The key length of an encryption algorithm for a package is determined in accordance with important data contained within a package. As a result, in a package, performance such as a content reading rate is decreased with an increase in the degree of importance of data contained in the relevant packet, thereby causing inconvenience to users.

In one aspect, it is an object of the present technology to improve a content reading rate.

Hereinafter, embodiments will be described based on drawings.

Example of Schematic Configuration of Information Processing System

Figure 1:
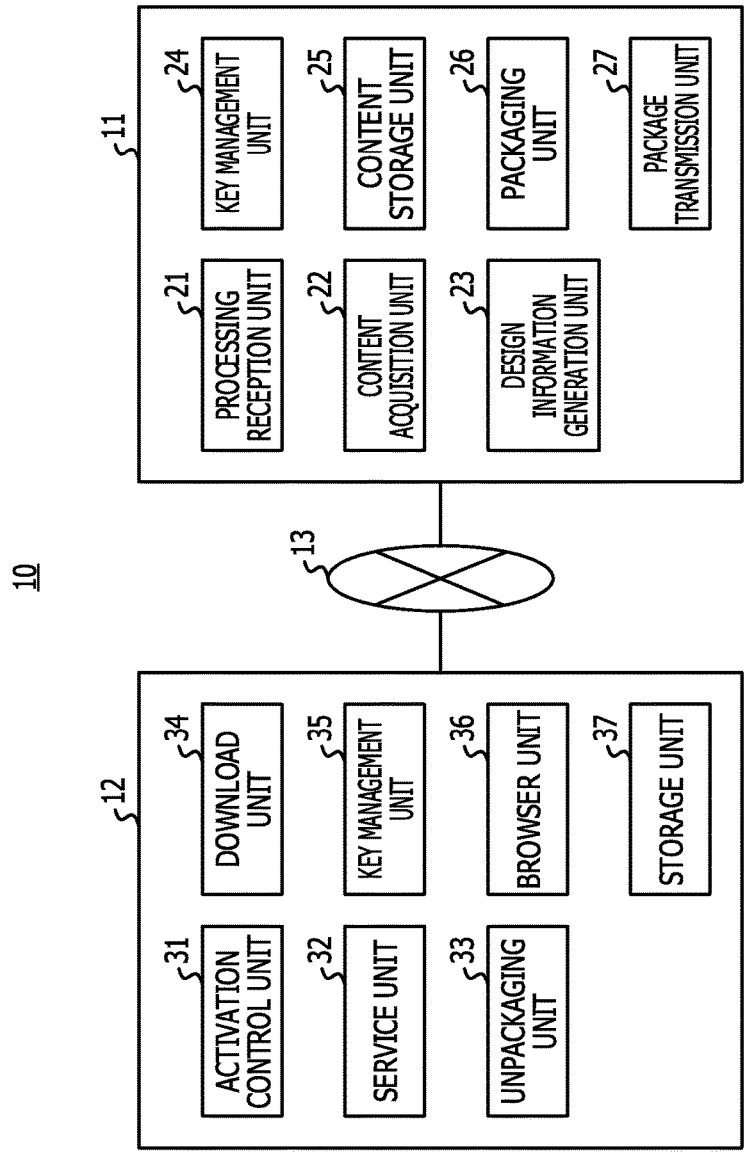
FIG. 1 is a diagram illustrating an example of a schematic configuration of an information processing system.

FIG. 1 is a diagram illustrating an example of a schematic configuration of an information processing system. An information processing system 10 illustrated in FIG. 1 includes a server 11 and a terminal device 12, as examples of information processing devices. The server 11 and the terminal device 12 are connected to each other in states of being able to transmit and receive data through a communication network 13 as typified by, for example, the Internet or a local area network (LAN). In addition, while, in the information processing system 10 illustrated in FIG. 1, the server 11 and the terminal device 12 are connected to the communication network 13 in a one-to-one relationship, the information processing system 10 is not limited to this and the servers 11 and the terminal devices 12 may be connected to the communication network 13 in an m-to-n (m,n≥1) relationship.

In a case of providing a packaged web (Web) application to the terminal device 12, the server 11 performs encryption processing (encryption wrapping) as a security countermeasure such as avoiding of information leak. The packaged web application is an application in which various kinds of contents including, for example, moving images, images, and texts are packaged.

Here, in encryption processing of the related art, each content within the packaged web application is encrypted using an encryption key generated from one password and an initialization vector and an encryption algorithm (key length) for a package is decided in accordance with the degree of importance of a content contained in the relevant package. As a result, in a case where a content whose degree of importance is high is contained therein, contents within the relevant package are uniformly encrypted in accordance with the degree of importance. Therefore, a decoder (decryption processing) on the terminal device 12's side takes time. Therefore, content reading performance is decreased, thereby causing inconvenience to users. Therefore, in the present embodiment, pieces of information relating to the types of encryption algorithm (for example, algorithm names), encrypted for individual content, are collectively encrypted and stored in a location specified by a decoder compliant with a web browser.

In a case of providing a packaged web application to the terminal device 12, the server 11 performs encryption processing (encryption wrapping) as a countermeasure against information leak. At that time, for each content contained within a package, an optimum encryption algorithm, an optimum compression algorithm, and so forth, negotiated with the terminal device 12's side, are selected and these are packaged, thereby improving content reading performance.

For each terminal device 12, the server 11 acquires pieces of performance information such as, for example, web performance and hardware performance and performs encryption and/or compression processing on contents in accordance with the acquired pieces of performance information. The encryption and/or compression processing includes at least one processing operation out of, for example, an encryption processing operation utilizing an encryption algorithm and a compression processing operation utilizing a compression algorithm. In addition, on the server 11's side, the server 11 performs encryption processing on information (for example, an algorithm name or the like) relating to the corresponding selected encryption and compression algorithm and stores the information (for example, an algorithm name or the like) in a location within a package specified by a decryption unit (decoder) associated with the web browser of the terminal device 12.

In addition, the server 11 may divide a content for each type (for example, an encryption algorithm name) of encryption algorithm associated with the performance information and obtained by negotiating with the terminal device 12's side and may perform encryption processing on each divided content using an encryption algorithm corresponding to the relevant content. In addition, at the time of performing the encryption and/or compression processing, an encryption processing load or the like may be calculated and contents may be subjected to encryption wrapping and distributed to the terminal device 12 in ascending order of the loads thereof. Not that while, as an example of calculation of a load, the load may be calculated as, for example, "a content size×encryption processing time/MB (encryption processing time in a predetermined data size (for example, 1 MB))", the calculation of the load is not limited to this. From this, it is possible to reduce a distribution delay and to improve content reading performance.

The server 11 may be, for example, a personal computer (PC) or the like and may be a cloud server configured by cloud computing including one or more information processing devices.

The terminal device 12 acquires a packaged web application transmitted from the server 11 and performs decryption processing and unpackaging processing on the acquired web application, thereby causing the web application to be performed on the web browser.

While examples of the terminal device 12 include a PC, a notebook PC, a tablet terminal, a smartphone, a game console, a music reproduction device, a wearable terminal, and so forth, the terminal device 12 is not limited to these.

According to the present embodiment, in one encryption wrapping operation, an encryption algorithm may be selected in accordance with the degree of importance of data. In other words, for each content, it becomes possible to select a protection level that takes into consideration the performance of the terminal device 12 and the risk of information leak, and it is possible to improve a content reading rate (the effective rate of a web application) while maintaining security performance.

Next, examples of functional configurations of the above-mentioned server 11 and terminal device 12 will be described.

Example of Functional Configuration of Server 11

The server 11 illustrated in FIG. 1 includes a, processing reception unit (reception unit) 21, a content acquisition unit 22, a design information generation unit 23, a key management unit 24, a content storage unit 25, a packaging unit 26, and a package transmission unit 27.

The processing reception unit 21 receives a request for a web application, issued from the terminal device 12. The processing reception unit 21 checks whether or not the identification information (for example, terminal ID) of a terminal device, contained in the received request, has been registered, and if the identification information has been registered, the processing reception unit 21 accepts the request.

In addition, in a case where the terminal device 12 is an already registered terminal device, the processing reception unit 21 acquires, based on negotiation with the terminal device 12, information (performance information) relating to the web performance, the hardware performance, and so forth of the terminal device 12. While the web performance is, for example, the performance of a decoder associated with the version of a web engine and a web browser, stream reading performance, a AES128 processing capacity, or the like, the web performance is limited to these. In addition, while the hardware performance is, for example, the presence or absence of encryption acceleration hardware or the like, the hardware performance is limited to this.

The content acquisition unit 22 acquires, from the content storage unit 25, one or more contents corresponding to the above-mentioned request for a web application. In addition, the content acquisition unit 22 acquires, from the content storage unit 25, a configuration file including information of a countermeasure against an information leak for the contents. Note that the contents and the configuration file, acquired by the content acquisition unit 22, does not have to be provided within the server 11 and may be acquired from an external device connected through the communication network 13.

From the configuration file and so forth acquired by the content acquisition unit 22, the design information generation unit 23 decides what encryption and compression algorithm is desired to be applied, in accordance with the performance information of the terminal device 12. In accordance with, for example, the data characteristic (for example, a file type, the degree of importance of each content, preliminarily set, or the like) of a content, the design information generation unit 23 selects an encryption algorithm corresponding to the performance information. In addition, the design information generation unit 23 selects a compression algorithm from the performance information or the like. The design information generation unit 23 generates, as design information, a result of the above-mentioned selection of the encryption algorithm and the compression algorithm, and so forth.

The key management unit 24 manages key information set in accordance with each user, each browser, each content, or the like. The key management unit 24 may store therein, for example, an encryption key while associating the encryption key with a corresponding terminal ID. While the key information is preliminarily set by an administrator or the like of the server 11, the key information is not limited to this.

The content storage unit 25 holds the content of one or more web applications or the like. In response to a request from the content acquisition unit 22, a corresponding content and a configuration file corresponding to the relevant content are extracted and the extracted information is output to the content acquisition unit 22.

The packaging unit 26 is an encryption unit (encoder) that performs encryption and/or compression processing on a content using, for example, an encryption key or the like stored and associated with a corresponding terminal ID. In addition, the packaging unit 26 may divide a content for each type of encryption algorithm associated with the performance information obtained from the terminal device 12 and may perform encryption processing on each of the divided contents. In addition, the packaging unit 26 may calculate the encryption processing load of each divided content and may perform encryption processing in a predetermined order corresponding to a calculation result. In accordance with, for example, the load of the encryption processing, the packaging unit 26 may divide contents and perform encryption wrapping thereon in ascending order of the loads thereof, thereby dividing a package.

The packaging unit 26 has a function as an analysis unit that analyzes, for example, the data characteristic of a web application. At the time of reading data from a package using, for example, a browser, a method for reading varies depending on the data characteristic thereof. In a case of, for example, moving image data, the browser displays data while reading the data in a stream. In contrast, in a case of documents such as PDFs, the browser displays data after reading the entire data. Therefore, in a case where a content is, for example, the moving image data, the packaging unit 26 performs packaging so as to optimize random access performance. In addition, in a case of a document such as a PDF, the packaging unit 26 performs packaging so as to optimize sequential performance. From this, it is possible to improve reading performance.

In addition, a large number of open-source libraries are used for web applications such as, for example, HTML5 and so forth. Therefore, by classifying encryption algorithms, based on open-source data, programs created by developers, and business data, it is possible for the packaging unit 26 to improve the reading performance. The packaging unit 26 may analyze, for example, the capacity of the decryption unit (decoder) and a file name and an extension of data included within a web application and, in response thereto, the packaging unit 26 may output, as a file, an encryption and compression level at which reading is optimized.

The package transmission unit 27 transmits (distributes) a packaged content to the corresponding terminal device 12 that issued a request for a web application. Note that, in a case where a package is divided under a preliminarily set condition, the package transmission unit 27 performs file transmission corresponding to the division number.

Example of Functional Configuration of Terminal Device 12

The terminal device 12 illustrated in FIG. 1 includes an activation control unit 31, a service unit 32, an unpackaging unit 33, a download unit 34, a key management unit 35, a browser unit 36, and a storage unit 37.

The activation control unit 31 activates the service unit 32 used for enabling a content stored in the storage unit 37 to be accessed using a hypertext transfer protocol (HTTP) protocol. In addition, when the activation is completed, the activation control unit 31 activates a browser to access the service unit 32 and provides services to a user.

For the browser that accesses using the HTTP protocol, the service unit 32 analyzes the protocol content thereof. In addition, the service unit 32 reads data from a specified storage in the storage unit 37 and makes a response to the browser side. The service unit 32 may have a function as, for example, a local server and may have a function as a web engine.

The unpackaging unit 33 is a decryption unit (decoder) that performs decryption processing on, for example, encrypted data stored in the storage unit 37. In addition, as for data not yet stored in the storage unit 37, the unpackaging unit 33 reminds the download unit 34 thereof.

The download unit 34 acquires and stores packaged data (encrypted data) from the service unit 32 and in the storage unit 37. In addition, in a case where a package is divided, the download unit 34 may acquire the division number thereof from the server 11 and may acquire the packages corresponding to the acquired division number by repeating downloading in accordance with, for example, time (vacant time) during which the load or the like of the terminal device 12 is low, or the like.

The key management unit 35 manages an encryption key used for packaging on the server 11's side and manages a relationship between a cookie generated by the activation control unit 31 in order to allow only a specific browser to access the service unit 32 and a content.

The browser unit 36 reproduces a content acquired using HTTP and displays the content on the screen (display unit or the like) of the terminal device 12.

The storage unit 37 stores therein a packaged content (for example, a web application, the address information of an encryption key, or the like) provided by the server 11 through the communication network 13 as described above. In addition, the storage unit 37 stores therein various kinds of information desired for execution of the present embodiment, various kinds of information (for example, the address information of the server 11 or runtime log information) obtained the execution, or the like.

Example of Hardware Configuration of Server 11 and Terminal Device 12

Figure 2:
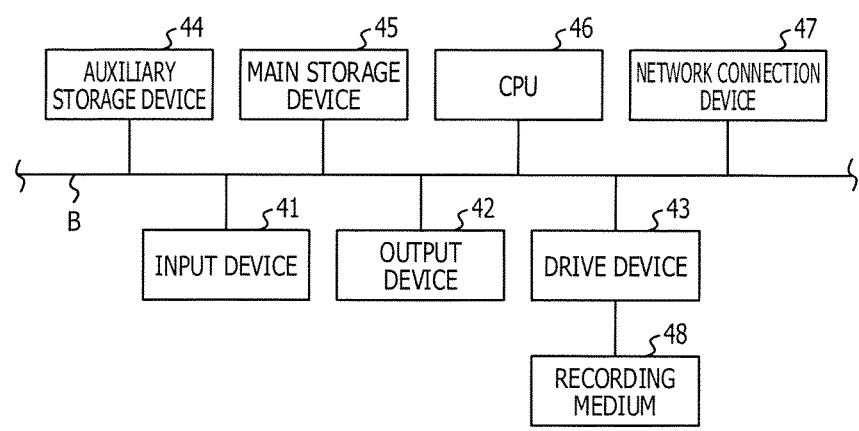
FIG. 2 is a diagram illustrating an example of a hardware configuration.

Next, an example of a hardware configuration of computers such as the server 11 and the terminal device 12 will be described using a drawing. FIG. 2 is a diagram illustrating an example of the hardware configuration. In the example of FIG. 2, the server 11 and the terminal device 12 each include an input device 41, an output device 42, a drive device 43, an auxiliary storage device 44, a main storage device 45, a central processing unit (CPU) 46, and a network connection device 47 and these are connected to one another through a system bus B.

The input device 41 includes a keyboard and a pointing device such as a mouse, operated by a user, and an sound input device such as a microphone and receives inputs of an instruction to perform a program, issued from a user, various kinds of operation information, information for activating software, and so forth.

The output device 42 includes a display or the like that displays various kinds of windows and various kinds of data, desired for operating a computer main body (the server 11 or the terminal device 12) used for performing processing in the present embodiment. The output device 42 is able to display the progress of execution, a result, and so forth of a program using a control program included in the CPU 46.

Here, in the present embodiment, an executable program to be installed into, for example, the computer main body such as the server 11 or the terminal device 12 is provided by a recording medium 48 or the like. The recording medium 48 is settable in the drive device 43. Based on a control signal from the CPU 46, the executable program stored in the recording medium 48 is installed into the auxiliary storage device 44 from the recording medium 48 through the drive device 43.

The auxiliary storage device 44 is a storage unit such as, for example, a hard disk drive (HDD) or a solid state drive (SSD). Based on a control signal from the CPU 46, the auxiliary storage device 44 stores therein the executable program (information processing program) in the present embodiment and a control program and so forth provided in the computer and performs inputting and outputting as appropriate. Based on a control signal from the CPU 46, the auxiliary storage device 44 is able to read desirable information from individual stored pieces of information and write desirable information thereinto.

The main storage device 45 stores therein the executable program and so forth read from the auxiliary storage device 44 by the CPU 46. The main storage device 45 includes a read only memory (ROM), a random access memory (RAM), and so forth.

Based on a control program such as an operating system (OS) and the executable program stored in the main storage device 45, the CPU 46 controls the processing of the entire computer, which includes the various kinds of calculations, inputting and outputting of data into and from individual hardware configuration units, and so forth, thereby realizing individual processing operations. Various kinds of information and so forth, desired during execution of a program, may be acquired from the auxiliary storage device 44 and an execution result and so forth may be stored therein.

Specifically, by causing a program installed into the auxiliary storage device 44 to be performed based on an instruction to perform the relevant program, obtained from, for example, the input device 41, the CPU 46 performs processing corresponding to the relevant program on the main storage device 45.

In a case of, for example, the server 11, by causing the information processing program to be performed, the CPU 46 performs processing operations such as reception of a request or the like from each terminal device 12, performed by the above-mentioned processing reception unit 21, acquisition of a content by the content acquisition unit 22, generation of the design information by the design information generation unit 23, management of keys by the key management unit 24, and packaging by the packaging unit 26.

In a case of, for example, the terminal device 12, by causing a program to be performed, the CPU 46 performs processing operations such as activation control by the activation control unit 31, web service control by the service unit 32, unpackaging of a packaged content by the unpackaging unit 33, downloading by the package download unit 34, management of decryption keys by the key management unit 35, and browsing by the browser unit 36. The content of processing performed in the CPU 46 is not limited to the above-mentioned content. A content performed by the CPU 46 is stored in the auxiliary storage device 44 or the like as appropriate.

Through the above-mentioned communication network 13, the network connection device 47 performs communication with the terminal device 12 or another external device. By connecting to the communication network 13 or the like, based on a control signal from the CPU 46, the network connection device 47 acquires an executable program, software, setting information, and so forth from an external device or the like. In addition, the network connection device 47 may provide, to the terminal device 12 or the like, an execution result obtained by performing a program or may provide, to an external device or the like, the executable program itself in the present embodiment.

As described above, the recording medium 48 is a computer-readable recording medium storing therein the executable program and so forth. While the recording medium 48 is, for example, a semiconductor memory such as a flash memory or a portable recording medium such as a CD-ROM or a DVD, the recording medium 48 is not limited to these.

By installing the executable program (for example, the information processing program or the like) into the hardware configuration illustrated in FIG. 2, it is possible for a hardware resources and software to realize display control processing and so forth in the present embodiment in cooperation with each other.

Outline of Present Embodiment

FIG. 3 is a diagram for explaining an outline of the present embodiment. The example of FIG. 3 illustrates two terminal devices 12-1 and 12-2 whose operating systems (OSs) are different. While the OSs are, for example, Android (registered trademark), iOS (registered trademark), Windows (registered trademark), and so forth, the OSs are not limited to these.

In the present embodiment, a content (data) such as an application created in a predetermined format (a file type such as, for example, HTML5, CSS, Javascript (registered trademark), pdf, or mp4) in the server 11 is packaged along with a plug-in module, an application development platform, a code (Your Code), and so forth. In addition, in the present embodiment, encryption processing (encryption and compression) is performed along with the packaging and contents are distributed (transmitted) to the respective terminal devices 12-1 and 12-2.

Example of Package Distribution Processing of Web Application

Next, an example of package distribution processing of a web application, which serves as an example of information processing in the present embodiment, will be described using a drawing.

FIG. 4 is a diagram illustrating a first embodiment of package distribution. In the example of FIG. 4, in a case where the server 11 packages a web application, the packaging unit 26 acquires performance information (for example, web performance and hardware performance) on the terminal device 12's side, from the unpackaging unit 33 in the corresponding terminal device 12. Here, while, as examples of the acquired pieces of performance information, for example, the version of a web engine, the presence or absence of encryption acceleration hardware, and so forth may be cited, the acquired pieces of performance information are not limited to these. The server 11 may acquire the information of, for example, the OS installed in the corresponding terminal device 12 and may acquire, based on the acquired information of the OS, the web performance and the hardware performance, preliminarily set.

In addition, at this time, information relating to the write position of a header is acquired from the unpackaging unit 33 in the corresponding terminal device 12 and the acquired information is output to the packaging unit 26.

In accordance with the performance information obtained from the corresponding terminal device 12, the packaging unit 26 performs packaging based on the encryption processing and the compression processing for each content of a web application. In the example of FIG. 4, "encrypted HTML5", encrypted pdf, encrypted mp4, and so forth are generated. In this case, encryption header information for a packaged application is generated and written in a location (for example, a specified header write position) within a package, specified by the unpackaging unit 33 (decryption unit). From this, the corresponding terminal device 12 is able to read the header information from the specified location and decrypt each content, thereby enabling a web application to be performed using the web engine. Note that the contents of the encryption header information are, for example, the encryption algorithm name, the initialization vector, and so forth of each content, the contents of the encryption header information are not limited to these.

Examples of Information Acquired by Server 11 from Terminal Devices 12

Next, examples of information acquired by the above-mentioned server 11 from the terminal devices 12 will be described using drawings. FIG. 5A and FIG. 5B are diagrams illustrating examples of information acquired from terminal devices.

In the present embodiment, as illustrated in, for example, FIGS. 5A and 5B, as pieces of information (terminal information) acquired from the respective terminal devices 12, installed OSs, pieces of performance information, and header write positions are acquired for individual terminals (for example, terminals 1 and 2). FIG. 5A is different in the information of writing a header from FIG. 5B.

While examples of the installed OS include an OS version, a type name, an application execution engine name, and so forth, the installed OS is not limited to these. In addition, while examples of the performance information includes AES (128, 256, standard) processing speed (MB/sec), the operation mode of unpackaging, a plaintext processing speed, and so forth, the performance information is not limited to these.

In addition, the operation mode of unpackaging indicates a numerical value of which operation mode the unpackaging unit 33 in the corresponding terminal device 12 is operated in. The operation mode of, for example, "1" corresponds to a case where an encryption engine is only implemented on, for example, a virtual machine (Dalvic). In addition, the operation mode of "2" corresponds to a case where an OpenSSL library implemented on an OS is used from, for example, Dalvic through Java (registered trademark) Native Interface (JNI). Note that while not illustrated in FIG. 5A, the operation mode of "3" defines a case where the hardware function of AES is used from, for example, Dalvic through JNI.

As for the performance information, there is a pattern in which the performance information is measured at the time of initial installation of each and every terminal device 12 while the operation mode of unpackaging is changed on the corresponding terminal device 12's side and the maximum level thereof is transmitted to the server 11's side. However, in many cases, by acquiring the content of the installed OS, it is possible for the server 11 to understand an approximate value. Therefore, in a case where it is possible to acquire the installed OS, the performance information does not have to be acquired.

From the acquired information, the design information generation unit 23 in the server 11 determines whether the terminal device has, for example, an AES128 processing capacity or not. The design information generation unit 23 sets a setting of, for example, displaying on a web browser within a predetermined time period (for example, five seconds or the like) and calculates a file size and an AES128 processing speed. If the calculation result thereof falls within five seconds, the design information generation unit 23 determines the terminal device as having a processing capacity. In addition, if the calculation result thereof does not fall within five seconds, the design information generation unit 23 determines the terminal device as not having a processing capacity.

In addition, the design information generation unit 23 may determine whether the terminal has stream reading performance or not. In a case where an average bit rate (for example, 8 MB/sec) is described in, for example, a file itself, the design information generation unit 23 may determine performance, based on the value thereof. For example, the doubled value of the average bit rate and the processing speed of an encryption algorithm of this file are compared with each other. In addition, if it is decided that the file is to be encrypted using, for example, AES256, the processing speed of an encryption algorithm is 8 MB/sec and lower than 16 MB/sec serving as twice as much as the average bit rate, in a case of a terminal device (for example, the terminal 1). Therefore, it is possible to determine the terminal device as not having the stream reading performance. Note that an acquisition method for the performance information is not limited to this and other performance information (for example, a CPU operation rate, a CPU load factor, or a transmission rate) or the like may be acquired.

In addition, in the present embodiment, as illustrated in the example of FIG. 5A, as header write information, the header write position is set based on a package or the number of bytes. In addition, in the present embodiment, as illustrated in the example of FIG. 5B, as the header write information, a header write package may be set based on an extension or a file name.

Next, individual processing operations performed in the server 11 and the terminal device 12 as the present embodiment will be described.

Registration Processing of Terminal Device 12

Figure 6:
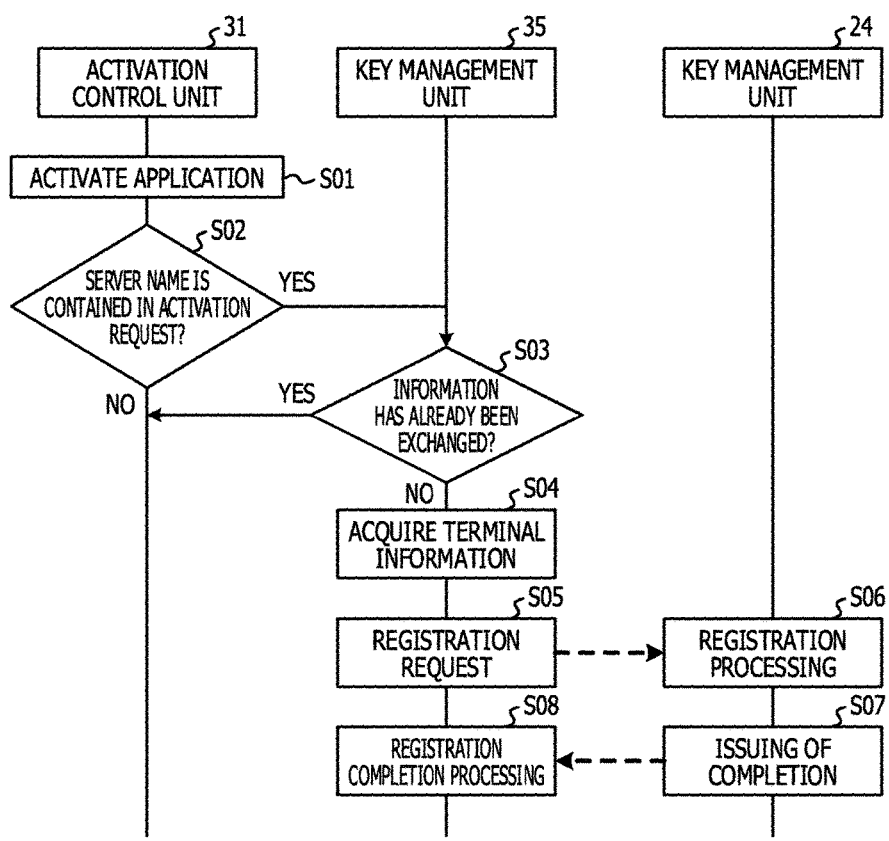
FIG. 6 is a sequence diagram illustrating an example of registration processing.

First, registration processing of the terminal device 12, performed in the server 11 for realizing the present embodiment, will be described using a sequence diagram. FIG. 6 is a sequence diagram illustrating an example of the registration processing. While the example of FIG. 6 includes the activation control unit 31 and the key management unit 35 on the corresponding terminal device 12's side and the key management unit 24 on the server 11's side, the registration processing is not limited to this.

The activation control unit 31 activates an application (S01) and determines whether or not the name (address information or the like) of the server 11 is contained in an activation request (S02). In a case where the server name is contained in the activation request (S02: YES), the key management unit 35 determines whether the terminal device 12 has exchanged information with the server 11 or not (S03).

When it is determined that the terminal device 12 has not exchanged information with the server 11 (S03: NO), the key management unit 35 acquires terminal information (S04) and transmits a registration request to the server 11 (S05). Note that the terminal information is the performance information, the write position of a header, or the like, described above, the terminal information is not limited to these.

The key management unit 24 on the server 11's side accepts the registration request from the corresponding terminal device 12, generates a terminal ID and an encryption key, and performs registration processing such as storing data including the terminal ID, the encryption key, and performance (S06). After the registration, the key management unit 24 issues completion information and transmits the terminal ID and the encryption key to the corresponding terminal device 12 (S07).

As registration completion processing, the key management unit 35 in the corresponding terminal device 12 stores, in the storage unit 37 or the like, data including the server name, the terminal ID, the key information, and the header write position (S08).

Note that in a case where, in the processing operation in S02, the server name is not contained in the activation request (S02: NO) or in a case where, in the processing operation in S03, the information has already been exchanged (S03: YES), the registration processing is terminated without change.

Content Request Processing

Figure 7:
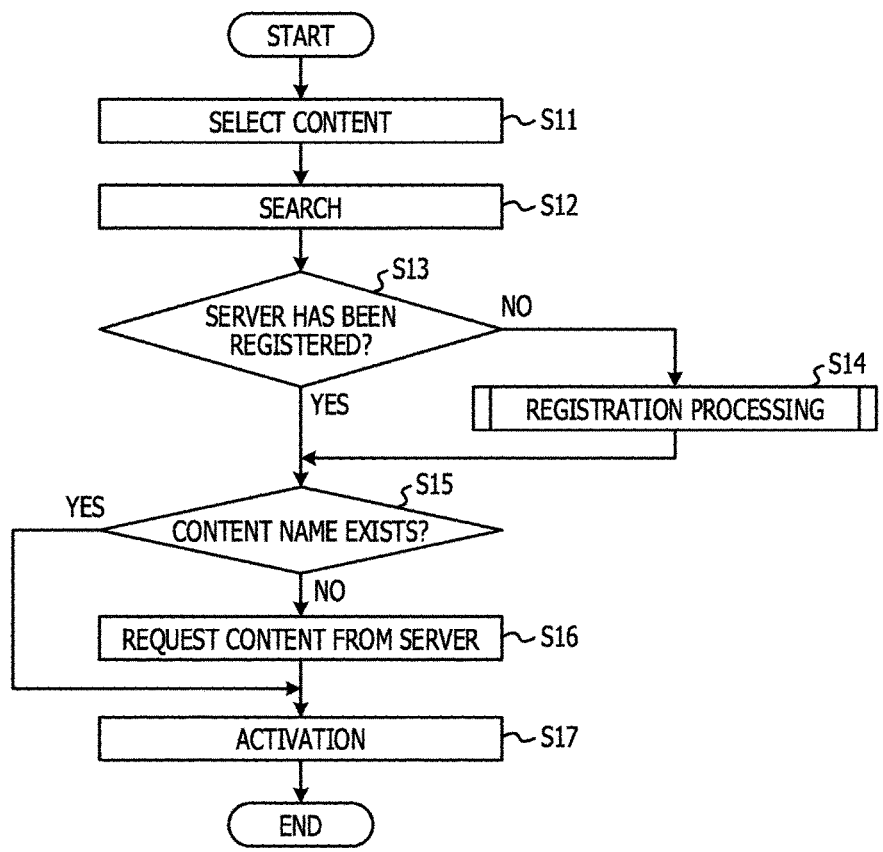
FIG. 7 is a flowchart illustrating an example of content request processing.

FIG. 7 is a flowchart illustrating an example of content request processing. In the example of FIG. 7, if a content (for example, a service name or the like) is selected by an instruction of a user (S11), the activation control unit 31 searches within the storage unit 37 to check whether or not the content is a content existing within the corresponding terminal device 12 (S12). In the storage unit 37, a server name (for example, 128.10.27.1), a content name (for example, Service name/index.html), a package name (abc.epkg1), and so forth are managed. From these, it is selected whether or not a corresponding content exists.

Here, the activation control unit 31 determines whether or not the server 11 has been registered (S13). In a case of not having been registered (S13: NO), the activation control unit 31 performs the above-mentioned registration processing (S14). In addition, in a case where the server 11 has been registered (S13: YES), the activation control unit 31 determines whether or not a content name exists (S15). In a case where no content name exists (S15: NO), the activation control unit 31 issues a content request to the server 11 (S16). In addition, in a case where a content name exists (S15: YES) or after the processing operation in S16, the activation control unit 31 activates the content (S17).

Package Acquisition Processing

FIG. 8 is a sequence diagram illustrating an example of package acquisition processing. The example of FIG. 8 illustrates the activation control unit 31 and the download unit 34 in the corresponding terminal device 12 and the processing reception unit 21, the design information generation unit 23, the packaging unit 26, and the package transmission unit 27 in the server 11.

In the example of FIG. 8, if the activation control unit 31 issues a content request (S21), the download unit 34 generates a request task (S22) and makes a request to the server 11 (S23). While, in this case, a terminal ID, a content name, and so forth are transmitted to the server 11, those to be transmitted are not limited to the terminal ID and the content name.

Next, the processing reception unit 21 in the server 11 generates a packaging task, based on a request content (S24). The design information generation unit 23 acquires performance information corresponding to the terminal ID and generates design information (S25). Next, the packaging unit 26 acquires a content, based on the generated design information, (S26) and performs encryption processing, based on an encryption key, a header write position, and so forth (S27).

Next, the packaging unit 26 performs packaging (S28). The package transmission unit 27 transmits, to the corresponding terminal device 12, a package obtained by the processing operation in S28 (S29).

The download unit 34 in the corresponding terminal device 12 performs data check (S30), determines whether or not data is received from the server 11 (Ready state?) (S31), and waits until being put into the Ready state. In addition, in a case of being put into the Ready state (S31: YES), data is received (S32). Next, the download unit 34 determines whether or not reception is completed (S33), and in a case where the reception is not completed (S33: NO), the download unit 34 repeatedly performs the reception until the reception is completed. In addition, in a case where the reception is completed (S33: YES), the download unit 34 stores the package and completes the reception (S34). In addition, the download unit 34 notifies the activation control unit 31 of reception completion.

Example of Design Information Generation Processing

FIG. 9 is a flowchart illustrating an example of design information generation processing. The example of FIG. 9 corresponds to the above-mentioned processing operation in S25. In the example of FIG. 9, the design information generation unit 23 reads a file (S41) and determines whether or not the read file is a target of a countermeasure against an information leak (S42).

In the processing operation in S42, for, for example, each content name (file type), whether being a target of a countermeasure against an information leak or not is preliminarily stored as setting information. In a case of, for example, a html file, it is possible for a system side to perform a setting. In a case of a pdf file or a mp4 file, it is possible to set a setting of being a target of a countermeasure against an information leak. In addition, in a case of a js file of a css file, it is possible to determine as not being a target of a countermeasure against an information leak (being open). Note that while not being limited to these, even in a case of, for example, pdf files, it is possible to set, for each file name, a setting of whether being a target of a countermeasure against an information leak or not. For example, it is set that "A.pdf" is a target of a countermeasure against an information leak, "B.pdf" is not a target of a countermeasure against an information leak, and so forth.

In a case where, in the processing operation in S42, the read file is a target of a countermeasure against an information leak (S42: YES), the design information generation unit 23 applies (selects), for example, an encryption algorithm (AES256) (S43). In addition, in a case where the read file is not a target of a countermeasure against an information leak (S42: NO), it is determined whether being a setting of entrusting to a system or not (S44). In a case of determination of entrusting to a system (S44: YES), the design information generation unit 23 determines whether having a processing capacity for the encryption algorithm (AES128) or not (S45). In addition, in a case of having the processing capacity (S45: YES), AES128 is applied (S46). In addition, in a case of not having the processing capacity for AES128 (S45: NO), the design information generation unit 23 applies an encryption algorithm (standard encryption) that is not advanced encryption such as AES256 or AES128 (S47). In addition, in a case of, in the processing operation in S44, not being a setting of entrusting to a system (S44: NO), the design information generation unit 23 applies non-encryption (S48).

From this, the design information generation unit 23 decides an encryption algorithm (S49). Next, the design information generation unit 23 determines whether a format is a format having a possibility of being subjected to stream reading or not (S50), and, when it is determined that the format is a format having a possibility of being subjected to stream reading (S50: YES), the design information generation unit 23 determines whether having stream reading performance or not (S51).

In a case of not having stream reading performance (S51: NO), the design information generation unit 23 selects non-compression (S52). In addition, in a case of having stream reading performance (S51: YES) or in a case of, in the processing operation in S50, not being a format having a possibility of being subjected to stream reading (S50: NO), the design information generation unit 23 performs compression (S53). From this, the design information generation unit 23 decides a compression algorithm (S54) and generates the design information (Enctype.xml) using the decided encryption algorithm and compression algorithm (S55).

Here, FIG. 10 is a diagram illustrating an example of the design information. In the design information (Enctype.xml) illustrated in the example of FIG. 10, the operation mode of unpackaging is set for each content. Accordingly, using this design information, it is possible to perform packaging processing. Note that the file illustrated in the example of FIG. 10 is an example and a file is not limited to this.

Example of Packaging Processing in Packaging Unit 26

Figure 11:
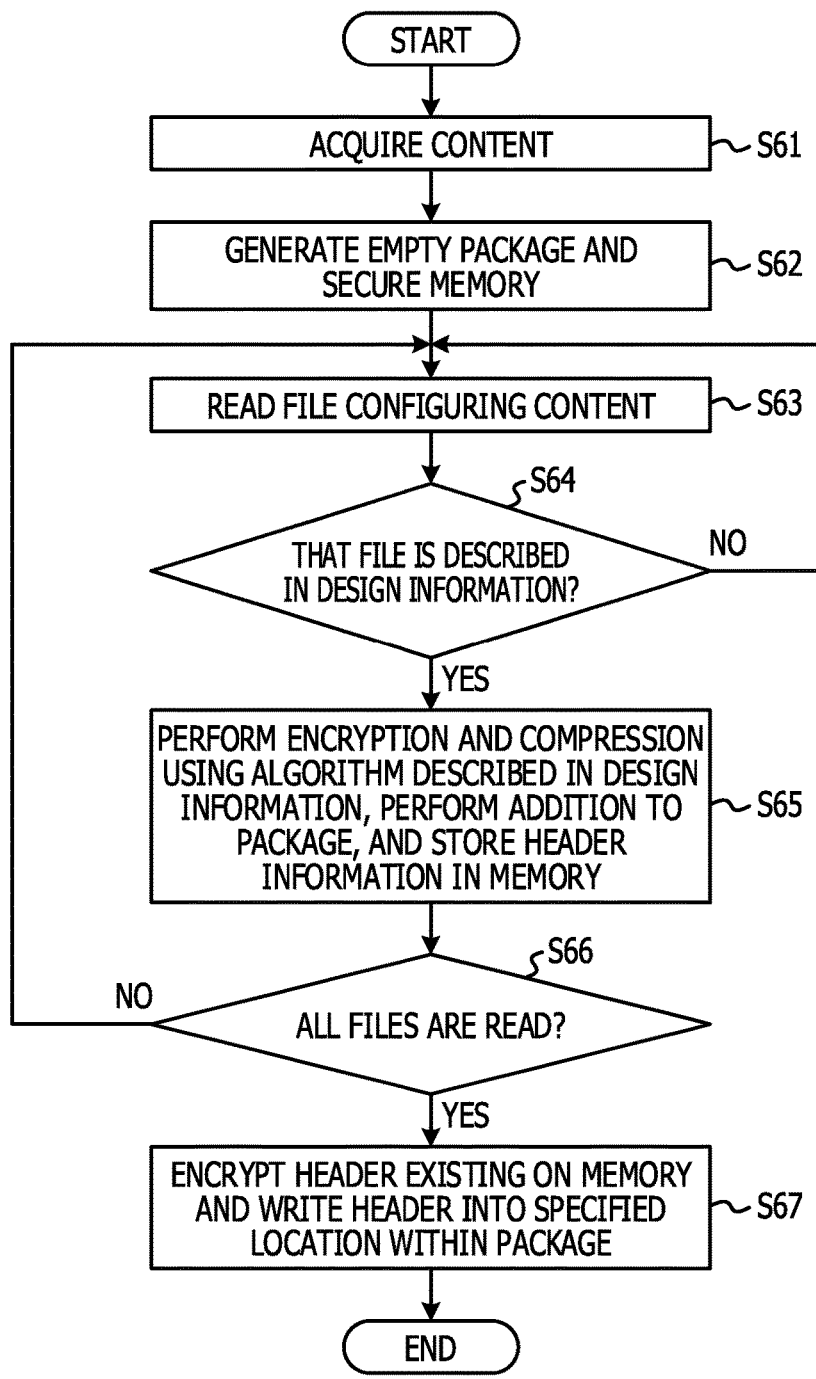
FIG. 11 is a flowchart illustrating an example of packaging processing.

FIG. 11 is a flowchart illustrating an example of the packaging processing. In the example of FIG. 11, the packaging unit 26 acquires a content (S61), generates an empty package, and secures a memory (S62). Next, the packaging unit 26 reads a file configuring a content (S63) and determines whether or not that file is described in the design information (S64).

In a case of not being described in the design information (S64: NO), the packaging unit 26 returns to the processing operation in S63. In addition, in a case of being described in the design information (S64: YES), the packaging unit 26 performs encryption and compression using an algorithm described in the design information, adds that file to the package, and stores the header information thereof in a memory or the like (S65).

Here, the packaging unit 26 determines whether or not all files are read (S66), and in a case where all the files are not read (S66: NO), the packaging unit 26 returns to the processing operation in S63. In addition, in a case where, in S66, it is determined that all the files are read (S66: YES), a header existing on the memory is encrypted and written into a specified location within the package (S67).

Example of Packaged Data Obtained in First Embodiment

Figure 12A:
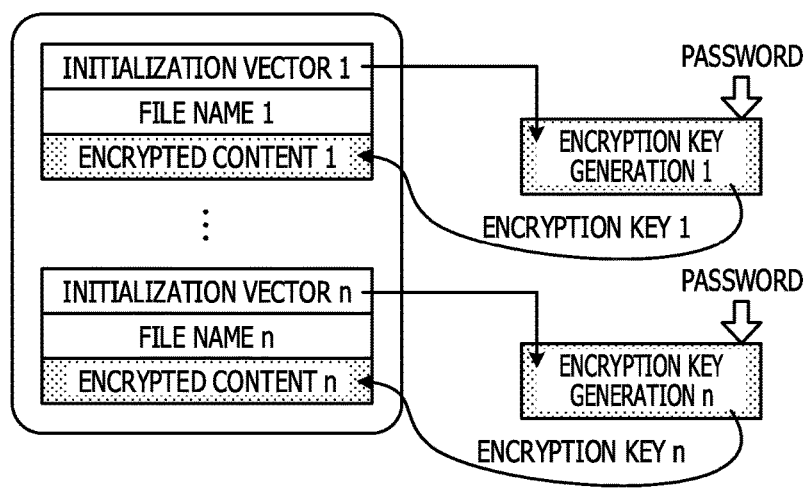
FIG. 12A and FIG. 12B illustrate examples of packaged data in a method of the related art.
Figure 12B:
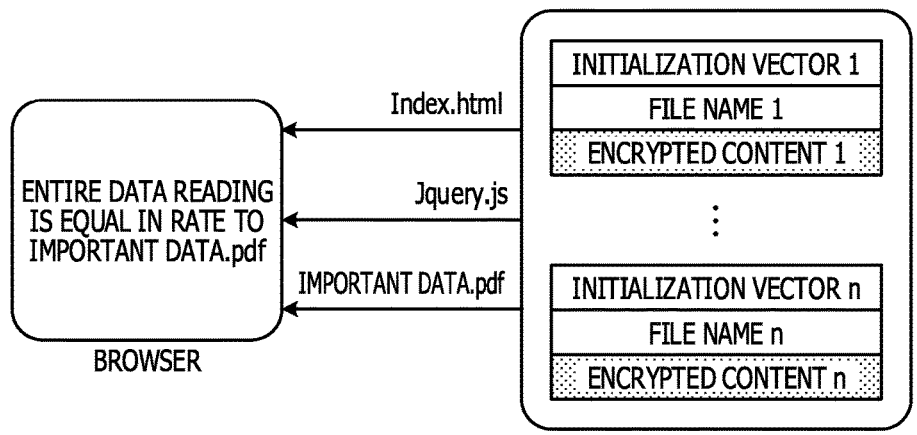
Figure 13A:
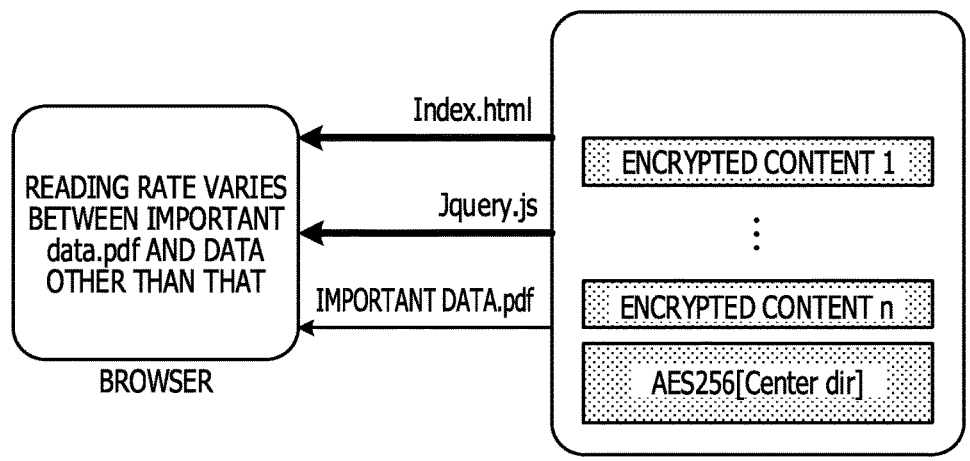
FIG. 13A and FIG. 13B illustrate examples of packaged data in the first embodiment.
Figure 13B:
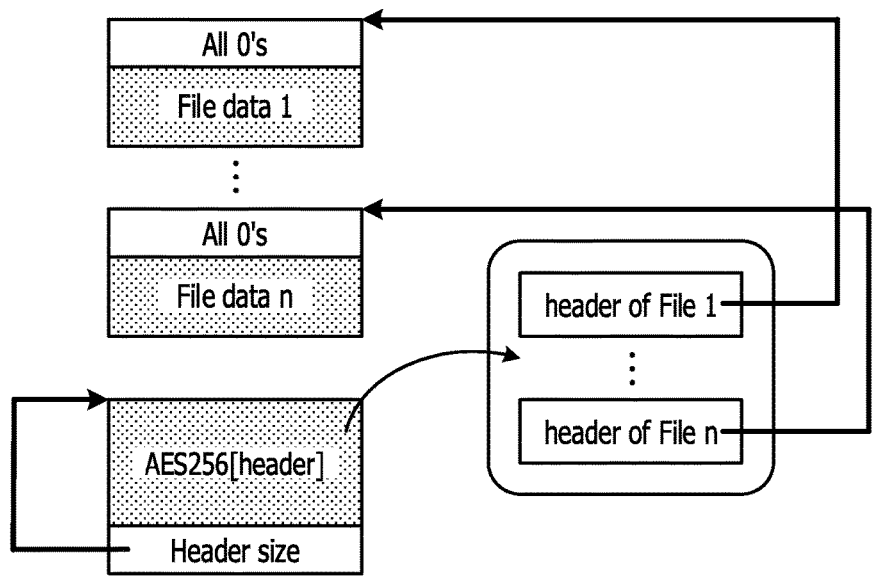

Next, an example of packaged data obtained in the first embodiment will be described using drawings. Note that, in the following description, in order to clarify a difference with a method of the related art, the description is performed using packaged data of the related art. FIG. 12A and FIG. 12B illustrate examples of packaged data in the method of the related art. FIG. 13A and FIG. 13B illustrate examples of packaged data in the first embodiment.

As illustrated in FIG. 12A, a typical method of the related art for encryption wrapping is an encrypted ZIP format. In the encrypted ZIP format, using an encryption key generated from one password and an initialization vector, each content is encrypted.

In that case, as illustrated in FIG. 12B, the encryption strength of a package is decided in accordance with important data contained within a package. As a result, in a package, performance is decreased with an increase in the degree of importance of data contained in the relevant packet, thereby causing inconvenience to users.

Therefore, in the first embodiment, as illustrated in FIG. 13A, within one encryption wrapping operation, an encryption algorithm is selected in accordance with the degree of importance of data, thereby performing packaging processing and encryption and/or compression processing. From this, as illustrated in FIG. 13A, a reading rate varies between important data.pdf and data other than that (the data other than the important data.pdf is subjected to higher-speed reading) and the effective rate of a web application is improved.

As illustrated in, for example, FIG. 13B, the corresponding terminal device 12 performs encryption and compression using a package format. Note that the example of FIG. 13B illustrates a package format in a case where, between the corresponding terminal device 12 and the server 11, it is agreed that the location of an encrypted header is the tail end of a file. While, in the header of each piece of file data (File data), for example, all 0's (All 0's) are set, the setting is not limited to this and an adequate random number may be set. In addition, in a ZIP format illustrated in FIG. 13B, an encryption algorithm (encryption parameter) is encrypted with a high strength.

In the example of FIG. 13B, the unpackaging unit 33 in the corresponding terminal device 12 secures an internal memory corresponding to, for example, a header size and performs decryption using a package password. In addition, the unpackaging unit 33 reads, from decrypted header information, a pointer of a file name or file data intended to be read and decrypts and acquires a file from that pointer.

Example of Generation URL for Content Reproduction

Here, generation processing of a URL for content reproduction in the terminal device 12 will be described using a drawing. FIG. 14 is a sequence diagram illustrating an example of generation of a URL for content reproduction. The example of FIG. 14 includes the activation control unit 31, the key management unit 35, the service unit 32, and the browser unit 36.

In a case where, in the example of FIG. 14, a content is reproduced, the activation control unit 31 generates a cookie from a random number (S71) and requests the service unit 32 to generate a URL for content reproduction (S72). Note that the cookie means a system for temporarily writing data, acquired from the server 11 or the like, into the corresponding terminal device 12 through a web browser and storing the data.

The service unit 32 receives a request and a cookie from the activation control unit 31 (S73) and generates a URL to be used by a browser to perform content reproduction (S74). Next, the service unit 32 notifies the activation control unit 31 of the generated URL (S75). While the URL given notice of is, for example, "10.0.0.1:8009/service/index.html" or the like, the URL is not limited to this.

Next, the activation control unit 31 notifies the key management unit 35 of acquired information (S76). The key management unit 35 stores, in a storage unit or the like, the cookie and the URL, obtained from the activation control unit 31, while associating the cookie and the URL with a content (S77). In addition, the activation control unit 31 gives notice of a content reproduction request (the URL and the cookie) (S78). The browser unit 36 stores the cookie and accesses the specified URL (S79).

Example of Decryption Processing in Terminal Device 12

Figure 15:
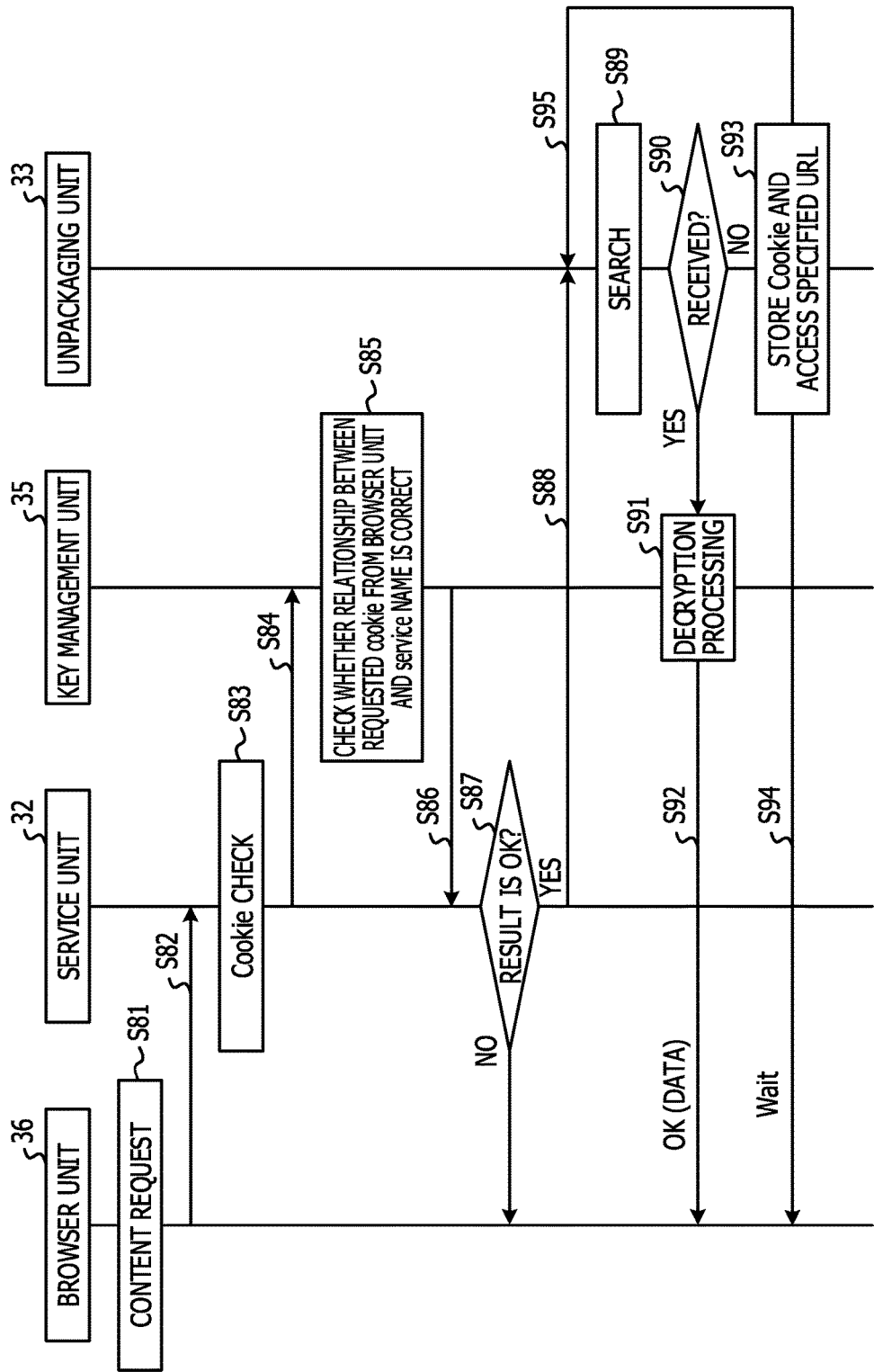
FIG. 15 is a sequence diagram illustrating an example of decryption processing in a terminal device.

Next, an example of decryption processing in the terminal device 12 will be described using drawings. FIG. 15 is a sequence diagram illustrating an example of decryption processing in a terminal device. Note that the example of FIG. 15 includes the browser unit 36, the service unit 32, the key management unit 35, and the unpackaging unit 33.

In the example of FIG. 15, based on an instruction or the like of a user, the browser unit 36 issues a content request (for example, 10.0.0.1:8009/service/index.html) to the service unit 32 (S81). The service unit 32 receives the request from the browser unit 36 (S82) and checks cookie information (S83). The service unit 32 makes an inquiry to the key management unit 35 in order to check the cookie information (S84).

The key management unit 35 checks whether a relationship between a requested cookie from the browser unit 36 and a service name is correct (S85) and notifies the service unit 32 of the check result thereof (S86).

The service unit 32 determines whether or not the result of checking is OK (S87) and in a case where the relationship is not correct (S87: NO), the service unit 32 outputs a response of an access load to the browser unit 36. In addition, in a case where the result of checking is OK (S87: YES), the service unit 32 notifies the unpackaging unit 33 of a requested content name (S88).

The unpackaging unit 33 searches for a content requested by the service unit 32 (S89) and determines whether the requested content has been received or not (S90). When it is determined that the requested content has been received (S90: YES), the unpackaging unit 33 transmits that content to the key management unit 35. The key management unit 35 performs decryption processing, based on an encryption key, a read header position, a package name, and so forth, which correspond to the content (S91), outputs OK data to the browser unit 36, and reproduces the content (S92). In addition, in a case where, in the processing operation in S90, it is determined that the requested content is not received (S90: NO), the unpackaging unit 33 confirms whether a packaged content is sent to the download unit 34 or the like from the server 11 (S93) and notifies the browser unit 36 of wait (Wait) information (S94) and the processing returns to the search in S89 (S95).

FIG. 16 is a diagram illustrating examples of download states. As illustrated in FIG. 16, the unpackaging unit 33 in the corresponding terminal device 12 manages download state data including items such as "content name", "package name", and ""received" flag", and so forth. In the above-mentioned search processing in S89, data ("finished (received)" or "unfinished (unreceived)") of ""received" flag" is referenced with a content name or the like as a search key and a download state is acquired.

Second Embodiment of Package Distribution

Figure 17:
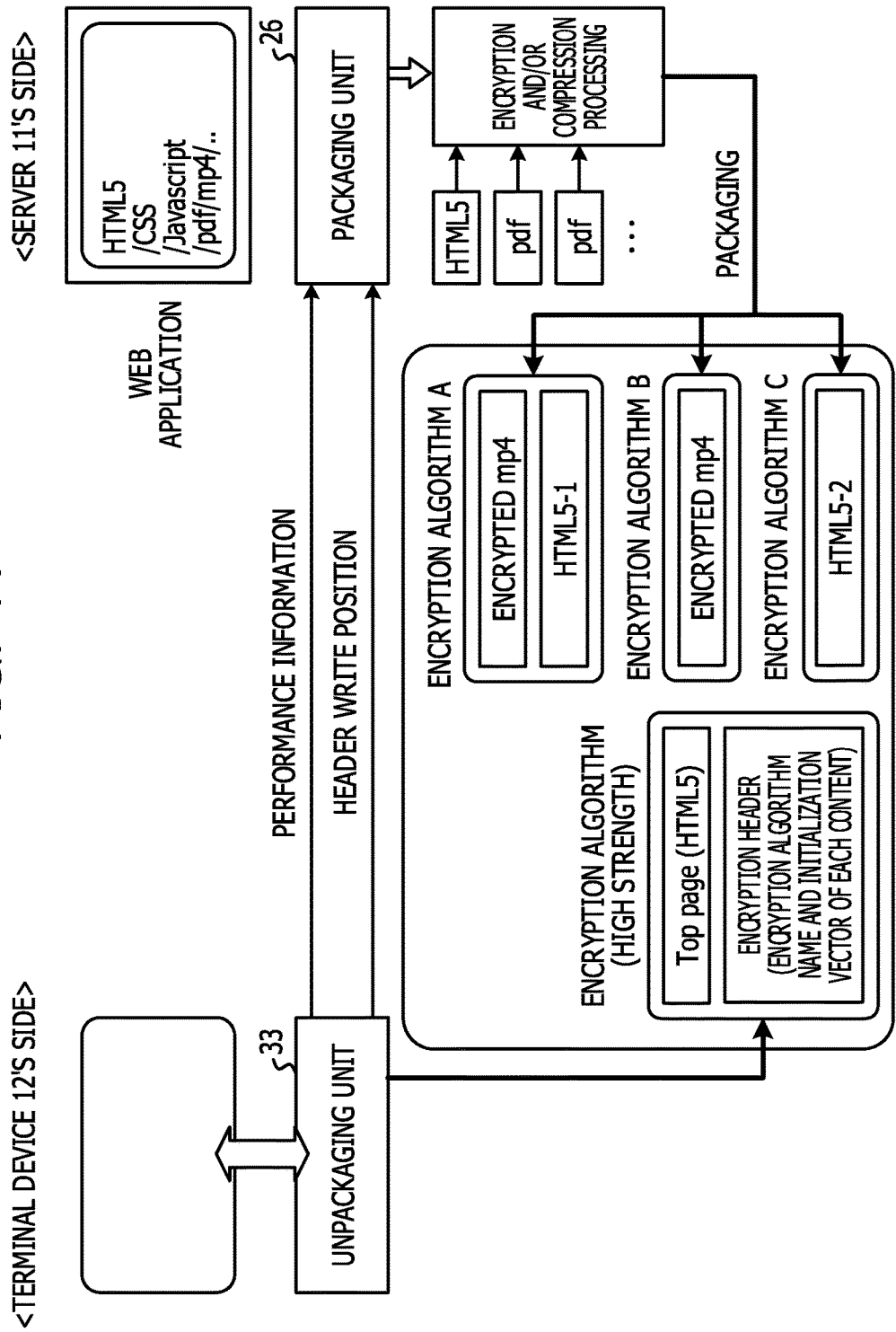
FIG. 17 is a diagram illustrating a second embodiment of the package distribution.

Next, an second embodiment of the package distribution will be described using a drawing. FIG. 17 is a diagram illustrating the second embodiment of the package distribution.

In the second embodiment illustrated in FIG. 17, a content is divided for each type (an encryption algorithm name) of encryption algorithm associated with the performance information and obtained by negotiating with the terminal device 12's side and encryption processing is performed on each divided content using an encryption algorithm corresponding to the relevant content. In addition, in the second embodiment, in a case of performing encryption processing, an encryption processing load (for example, "a content size×encryption processing time/MB") is calculated and contents are subjected to encryption wrapping and transmitted to the terminal device 12's side in ascending order of the loads thereof, thereby reducing a distribution delay and improving content read performance.

In the example of FIG. 17, an encryption algorithm (high strength) for an encryption header is distributed first and after that, divided encryption algorithms A to C are distributed in a predetermined order in accordance with the encryption processing loads thereof or the like. In the same way as the first embodiment, the corresponding terminal device 12 is able to read the header information from a specified location and decrypt each content and is able to display in a web browser using a web engine or the like.

Here, since, as for the functional configurations, the hardware configurations, and so forth of the server 11 and the terminal device in the second embodiment, it is possible to use the same as those of the first embodiment, the specific descriptions thereof will be omitted here. In addition, in the following description, a portion in which there is a difference with the above-mentioned first embodiment will be described and the description of a portion in which common processing is performed will be omitted.

Example of Packaging Processing in Second Embodiment

Figure 18:
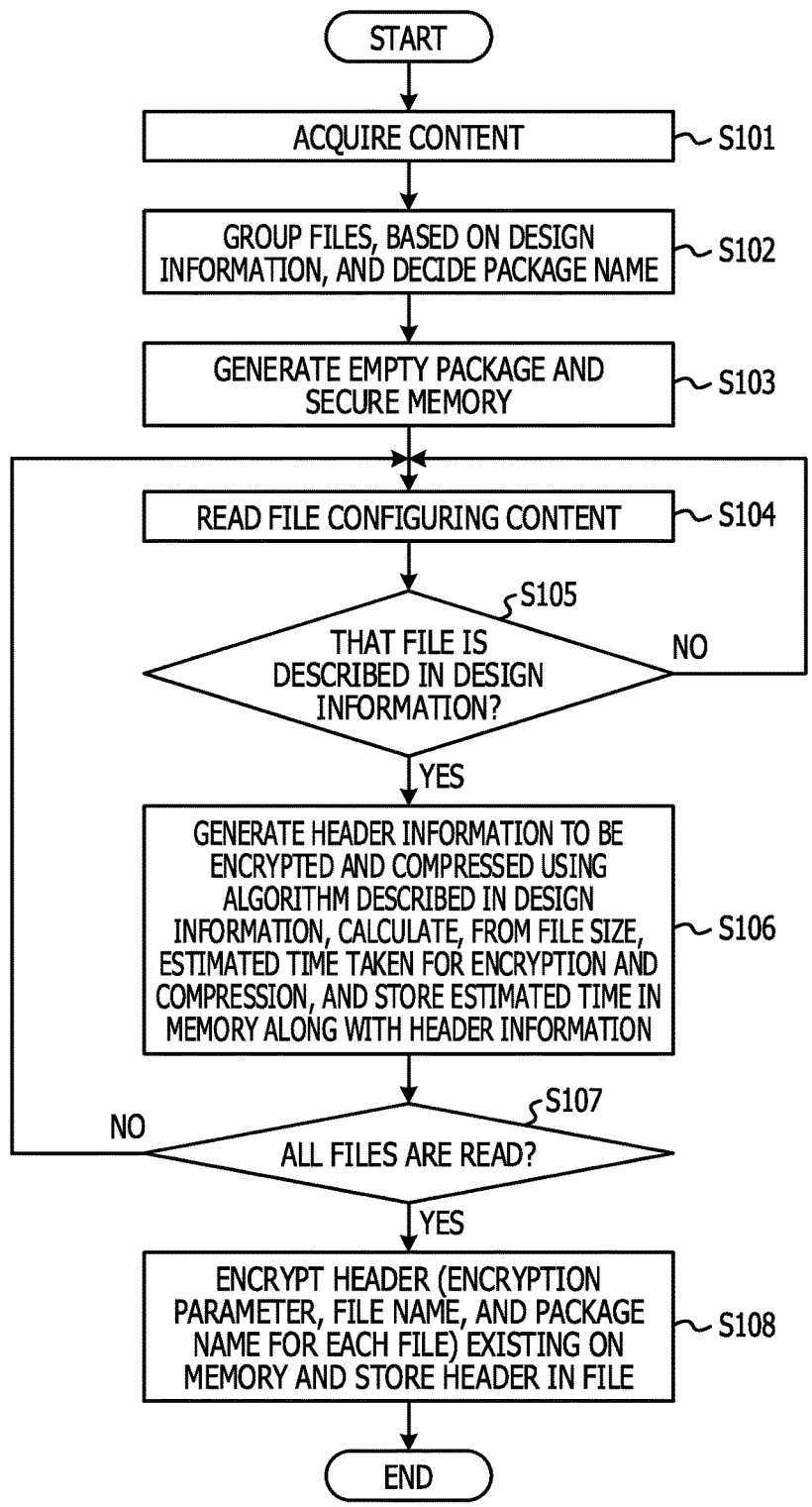
FIG. 18 is a flowchart illustrating an example of packaging processing in the second embodiment.

FIG. 18 is a flowchart illustrating an example of packaging processing in the second embodiment. In the example of FIG. 18, the packaging unit 26 acquires a content acquired by the content acquisition unit 22 (S101) and groups, based on the design information, files for, for example, each encryption algorithm name and decides a package name (S102).

Next, the packaging unit 26 generates an empty package, secures a memory (S103), and reads a file configuring a content (S104). Here, the packaging unit 26 determines whether or not that file is described in the design information (S105), and in a case of not being described in the design information (S105: NO), the packaging unit 26 returns to the processing operation in S104 and reads a subsequent file. In addition, in a case of being described in the design information (S105: YES), the packaging unit 26 generates header information to be encrypted and compressed using algorithms described in the design information, calculates, from a file size, estimated time taken for encryption and compression, and stores the estimated time in a memory along with the header information (S106).

Here, the packaging unit 26 determines whether or not all files are read (S107), and in a case where all the files are not read (S107: NO), the packaging unit 26 returns to the processing operation in S104 and reads a file not yet read. In addition, in a case where all the files are read (S107: YES), a header (for example, an encryption parameter, a file name, and a package name for each file) existing on a memory is encrypted using an encryption key or the like corresponding to a terminal ID and stored in a file (S108).

FIG. 19 is a diagram illustrating an example of data in the second embodiment. The example of FIG. 19 illustrates an example of data stored in the memory in the processing operation in S106. While the items of data in FIG. 19 are, for example, "file name", "encryption parameters (an algorithm and an initial vector)", "compression parameter", "encryption key for each file", "estimated time", "package name", and so forth, the items of data are not limited to these.

In the second embodiment, the estimated time taken for encryption and compression is generated for each file name, and encryption wrapping is performed, based on individual estimated times, on contents in order starting, for example, a content whose estimated time is shorter (whose load is lower).

Example of Transmission Processing after Packaging in Second Embodiment

Figure 20:
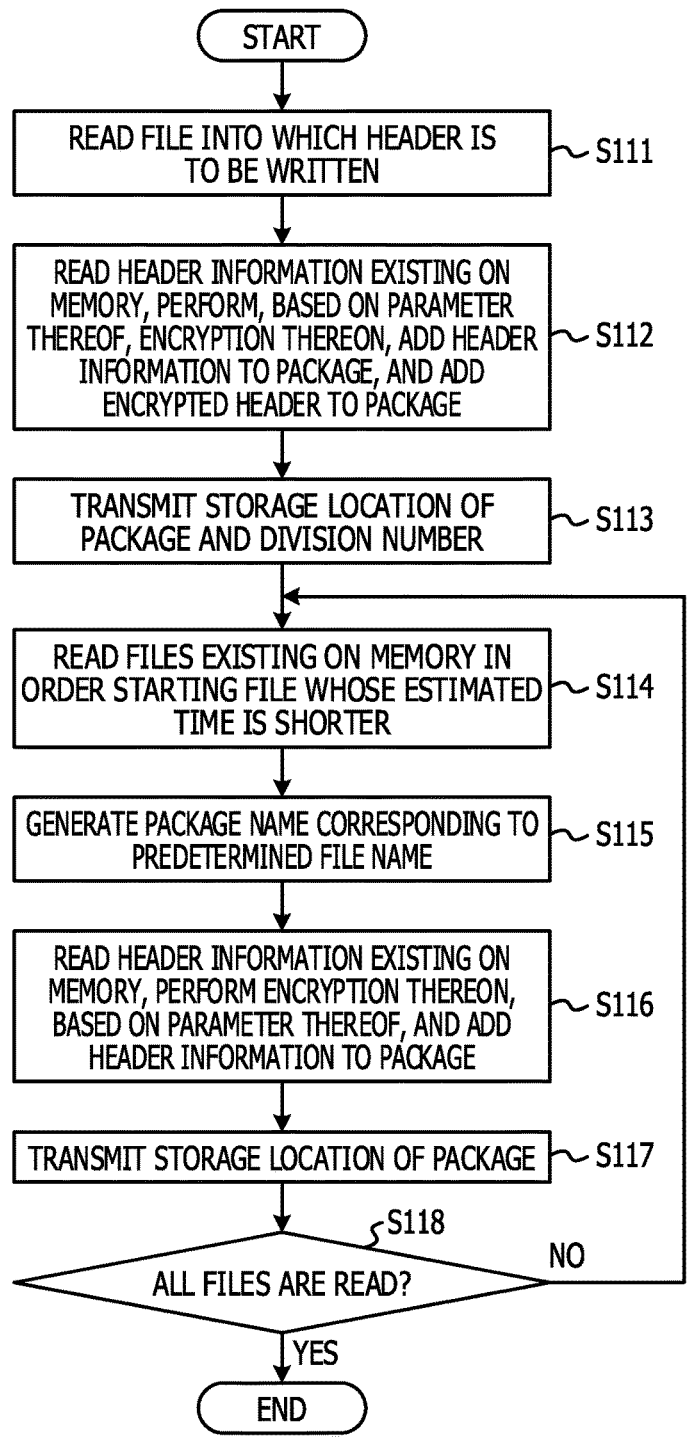
FIG. 20 is a flowchart illustrating an example of transmission processing after packaging in the second embodiment.

FIG. 20 is a flowchart illustrating an example of transmission processing after packaging in the second embodiment. In the example of FIG. 20, the packaging unit 26 reads a file into which a header is to be written in accordance with a terminal ID or the like (S111), reads header information existing on a memory, performs, based on the parameter thereof, encryption thereon, adds the header information to a package, and adds the encrypted header to the package (S112). Next, the packaging unit 26 causes the transmission unit 27 or the like to transmit the storage location of a generated package and a division number (=the number of packages scheduled to be generated) to the terminal device 12 (S113).

Next, the packaging unit 26 reads files existing on the memory in order starting a file whose estimated time is shorter (S114) and generates a package name corresponding to a predetermined file name (S115). Next, the packaging unit 26 reads the header information existing on the memory, performs encryption thereon, based on the parameter thereof, and adds the header information to a package (S116).

Next, the packaging unit 26 causes the package transmission unit 27 or the like to transmit the storage location of the generated package existing on the memory to the terminal device 12 (S117).

Here, the packaging unit 26 determines whether or not all files are read (S118), and in a case where all the files are not read (S118: NO), the packaging unit 26 returns to the processing operation in S114 and reads a file not yet read. In addition, in a case where all the files are read (S118: YES), the packaging unit 26 terminates the processing.

From this, in the second embodiment, it is possible to reduce a distribution delay and to improve content reading performance.

As described above, according to the present embodiment, it is possible to improve a content reading rate. For example, each content contained within a package is processed using an encryption and compression algorithm negotiated with the terminal device 12's side and a parameter at the time of applying a parameter and the encryption and compression algorithm, which are negotiated, to each content is encrypted and stored in a location specified by the terminal device 12's side, thereby improving content reading performance. Therefore, according to the present embodiment, for each content, it becomes possible to select a protection level that takes into consideration the performance of a terminal and the risk of information leak, and it is possible to improve the effective rate of a web application.

In addition, according to the present embodiment, it is possible to optimize a package decryption function for a terminal device and to perform package optimization in accordance with a decryption capability and a data characteristic.

Note that while, in the above-mentioned embodiments, encryption in the distribution of a web application is described, the present technology is not limited to this and may be applied to the distribution of another application or various kinds of data in the same way.

While the embodiments are described in detail as above, the present technology is not limited to specific embodiments and various modifications and alternations may be made insofar as they are within the scope of the appended claims. In addition, all or part of the above-mentioned individual embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encryption method for packaging, encrypting, and transmitting a plurality of contents included in a web application to a communication device, the encryption method comprising:
    acquiring performance information relating to performance of the communication device;
    determining, by circuitry, an encryption algorithm to be applied to each of the plurality of contents, based on the performance information;
    performing first encryption processing on the plurality of contents using the encryption algorithm respectively;
    performing second encryption processing on identification information that identifies the encryption algorithm used for the plurality of contents respectively;
    packaging encrypted contents and encrypted identification information, the encrypted identification information being stored in a location specified by the communication device; and
    transmitting the encrypted contents and the encrypted identification information, which are packaged, to the communication device.

2. The encryption method according to claim 1, wherein the performance information relates to at least one of first performance of a web browser of the communication device and second performance of hardware of the communication device.

3. The encryption method according to claim 1, wherein the location is specified by a decoder associated with a web browser of the communication device.

4. The encryption method according to claim 1, wherein the location is specified based on a position where a header is written.

5. The encryption method according to claim 1, further comprising:

determining, based on the performance information, a compression algorithm for each of the plurality of contents; and performing compression processing on the plurality of contents using the compression algorithm respectively.

6. The encryption method according to claim 1, further comprising:

dividing each of the plurality of contents in accordance with the identification information of the encryption algorithm, wherein the first encryption processing is performed on each of the divided contents.

7. The encryption method according to claim 6, further comprising:

calculating a load of the first encryption processing for each of the divided contents; and deciding, based on the load, an order of implementing the first encryption processing on each of the plurality of contents.

8. The encryption method according to claim 7, wherein the first encryption processing is performed on each of the plurality of the contents in ascending order of the loads thereof.

9. An information processing device for packaging, encrypting, and transmitting a plurality of contents included in a web application to a communication device, the information processing device comprising:

a memory; and a processor coupled to the memory and configured to:

acquire performance information relating to performance of the communication device, determine an encryption algorithm to be applied to each of the plurality of contents, based on the performance information;

perform first encryption processing on the plurality of contents using the encryption algorithm respectively, perform second encryption processing on identification information that identifies the encryption algorithm used for the plurality of contents respectively, package encrypted contents and encrypted identification information, the encrypted identification information being stored in a location specified by the communication device, and transmit the encrypted contents and the encrypted identification information, which are packaged, to the communication device.

10. The information processing device according to claim 9, wherein the performance information relates to at least one of first performance of a web browser of the communication device and second performance of hardware of the communication device.

11. The information processing device according to claim 9, wherein the location is specified by a decoder associated with a web browser of the communication device.

12. The information processing device according to claim 9, wherein the location is specified based on a position where a header is written.

13. The information processing device according to claim 9, wherein the processor is configured to:

determine, based on the performance information, a compression algorithm for each of the plurality of contents, and perform compression processing on the plurality of contents using the compression algorithm respectively.

14. The information processing device according to claim 9, wherein the processor is configured to divide each of the plurality of contents in accordance with the identification information of the encryption algorithm, and the first encryption processing is performed on each of the divided contents.

15. The information processing device according to claim 14, wherein the processor is configured to:

calculate a load of the first encryption processing for each of the divided contents, and decide, based on the load, an order of implementing the first encryption processing on each of the plurality of contents.

16. The information processing device according to claim 15, wherein the first encryption processing is performed on the plurality of contents in ascending order of the loads thereof.

* * * * *